United States Patent
Wooten

(10) Patent No.: US 6,947,014 B2
(45) Date of Patent: Sep. 20, 2005

(54) PERSONALIZED, PRIVATE EYEWEAR-BASED DISPLAY SYSTEM

(76) Inventor: Gary L. Wooten, 309 Nettletree La., Fayetteville, NC (US) 28301

( * ) Notice: Subject to any disclaimer, the term of this patent is extended or adjusted under 35 U.S.C. 154(b) by 366 days.

(21) Appl. No.: 10/327,786

(22) Filed: Dec. 23, 2002

(65) Prior Publication Data

US 2004/0119663 A1 Jun. 24, 2004

(51) Int. Cl.[7] ................................................. G09G 5/00
(52) U.S. Cl. .................................. 345/8; 345/7; 348/53
(58) Field of Search ............................ 349/11; 345/7–9; 351/158; 348/52, 53; 359/462, 463, 63

(56) References Cited

U.S. PATENT DOCUMENTS

| | | | | |
|---|---|---|---|---|
| 5,003,300 A | * | 3/1991 | Wells | 345/8 |
| 5,276,471 A | * | 1/1994 | Yamauchi et al. | 351/153 |
| 5,281,957 A | * | 1/1994 | Schoolman | 345/8 |
| 5,579,026 A | * | 11/1996 | Tabata | 345/8 |
| 5,790,085 A | * | 8/1998 | Hergesheimer | 345/8 |
| 5,825,340 A | * | 10/1998 | Torizuka et al. | 345/8 |
| 5,963,371 A | * | 10/1999 | Needham et al. | 359/464 |
| 6,483,483 B2 | * | 11/2002 | Kosugi et al. | 345/8 |
| 6,597,328 B1 | * | 7/2003 | Stern et al. | 345/9 |

* cited by examiner

*Primary Examiner*—Xiao Wu
(74) *Attorney, Agent, or Firm*—MacCord Mason PLLC

(57) ABSTRACT

An eyewear-based computer display system included with accessories that make the system capable of privately viewing a computer screen by an eyewear user. The device is attachable to a computer as a peripheral device for viewing images that would otherwise be displayed on a computer screen. Also, upon attachment the device includes a monitor auto-blanking system that allows images to no longer be seen on the computer screen, but only be seen within the eyewear device. The device assures for privacy of the user allowing them to have full capacity of their computer screen in a personal viewing system.

18 Claims, 1 Drawing Sheet

PERSONALIZED, PRIVATE EYEWEAR-BASED DISPLAY SYSTEM

BACKGROUND OF THE INVENTION (1) Field of the Invention

The present invention relates generally to electronic displays, and more particularly to a personalized, private eyewear-based display system.

(2) Description of the Prior Art

U.S. Pat. No. 6,349,001 issued Feb. 19, 2002, to Spitzer, et al. and assigned to The Microoptical Corporation for Eyeglass Interface System provides for an eyeglass interface system which integrates interface system with eyewear.

U.S. Pat. No. 6,353,503 issued Mar. 5, 2002, to Spitzer, et al. and assigned to The Microoptical Corporation for Eyeglass Display Lens System Employing Off-Axis optical Design provides for an off-axis optical display system, including an interface located between the lenses that transmits light along an optical path with respect to the interface surface toward the eye of a user.

U.S. Pat. No. 6,232,934 issued May 15, 2001 to Heacock, et al. and assigned to Virtual Vision for Binocular Head Mounted Display System provides for a binocular head-mounted optical display system, including an interface that is plugged into the keyboard of a computer system; the device then utilizes light and the user's natural vision to make images that appear on the screen larger within a visor.

The prior art does not address the need for clarity of view or display as that which one gets from a computer screen. Moreover, past glasses do not utilize functionality allowable by modern-day computers. The present invention addresses these needs.

SUMMARY OF THE INVENTION

The present invention is directed to a personalized, private eyewear-based display system for viewing a computer screen display field within an eyewear-based display that is portable and wearable by a user.

The present invention is further directed to a device for private viewing of a standard video signal from a computer, wherein the device includes eyewear, a signal-transmitting connection connecting the eyewear to a video output, a power source, and a display mechanism in the eyewear for private viewing of the video signal.

Accordingly, one aspect of the present invention is to provide eyewear that includes a frame and at least one lens mounted within said frame that provides for a computer screen display field within an eyewear-based display that is portable and wearable by a user. Another aspect of the invention is to make the frame from metal or plastic. Still another aspect of the invention substantially resembles a standard eyeglass frame.

In another aspect of the invention the video signal is displayed by a miniature LCD display. Another aspect of the invention has an LCD display affixed to the at least one lens.

In still another aspect of the invention the display mechanism is a projection device. In a further aspect of this invention the projection device uses proximal vision off-axis technology.

In another aspect of the invention the display mechanism depicts a scaleable view as would be seen using a standard display device. In still a further aspect of this invention the scaleable view is a partial computer screen view. In still a further aspect of this invention the scaleable view is a complete computer screen view.

In another aspect of the invention, a display navigation device is provided to move a cursor or pointer on the display. In a further aspect of this invention the display navigation device is a computer mouse peripheral device that provides for user movement of a cursor with a corresponding cursor indicator that appears within the viewing field of the user.

DETAILED DESCRIPTION OF THE INVENTION

Figure 1:
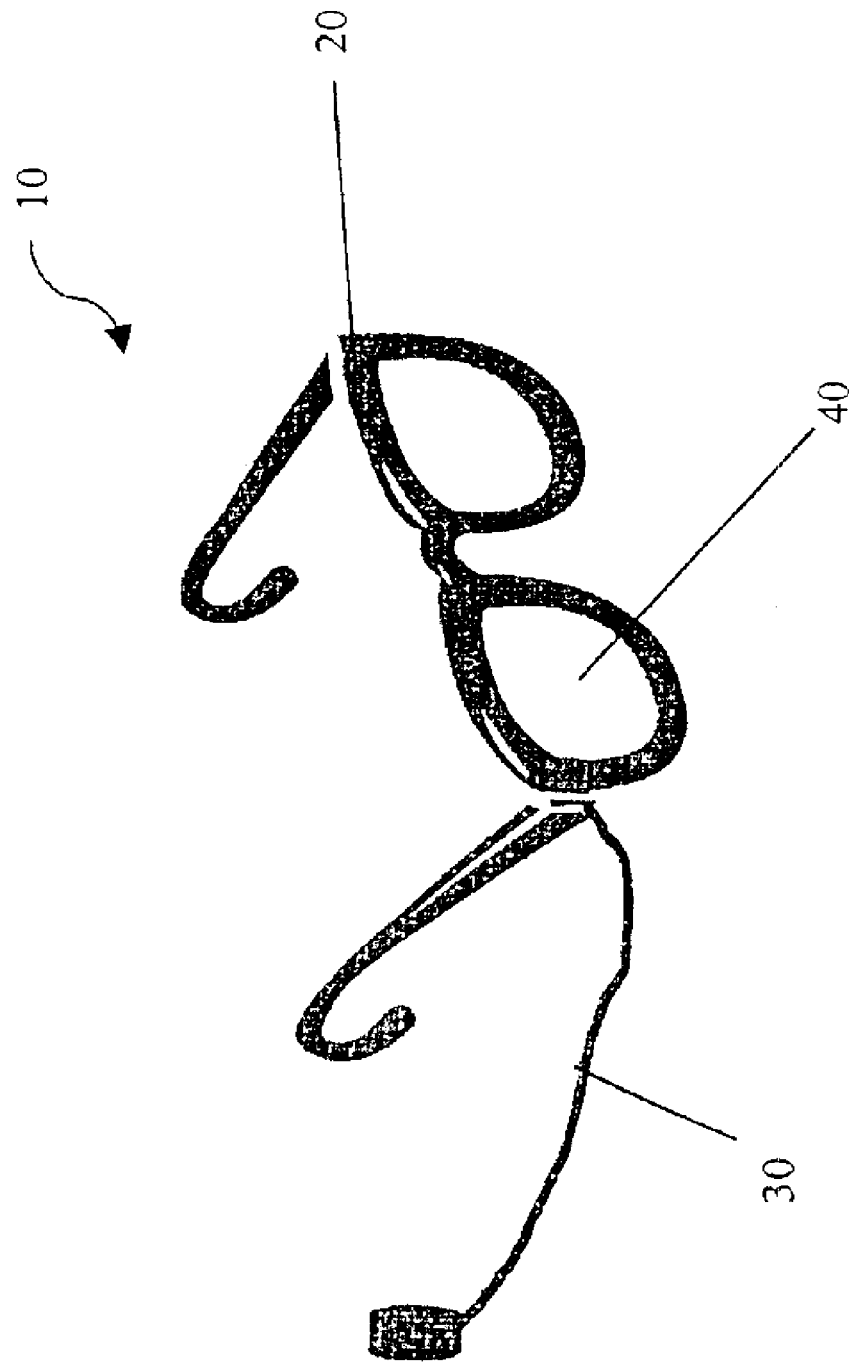
FIG. 1 shows a perspective view of a preferred embodiment according to the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Referring now to the drawings in general, the illustrations are for the purpose of describing a preferred embodiment of the invention and are not intended to limit the invention thereto.

The present invention provides an eyewear-based computer display system that may function as a computer peripheral device, such as a projector, and provides for privately viewing a computer screen by a user. The device is attachable to a computer as a peripheral device for viewing images that would otherwise be displayed on a computer screen. Also upon attachment the device includes a monitor auto-blanking system that allows images to no longer be seen on the computer screen, but only be seen within the eyewear device. The device assures for privacy of the user allowing them to have full capacity of their computer screen in a personal viewing system.

The present invention provides for a personalized, private eyewear-based display system for private viewing of a standard video signal. Standard video signal is Red-Green-Blue with horizontal and vertical synchronization. This permits a computer user who may have a need for privacy while operating their computer such as on an airplane. The computer user can put on the glasses and view the display that is on his or her computer monitor. As shown in FIG. 1, the preferred embodiment of the invention, generally referenced 10, has four main components including eyewear 20, a signal-transmitting communication connector 30, for non-wireless embodiments, connecting the eyewear to a video output, a power source (not shown) such as a battery or power supplied externally via a plug into an outlet or supplied through the computer, and at least one display mechanism 40 for private viewing of the video signal. The present invention provides for a peripheral device for a computer for private viewing of a standard video signal on the inside portion of the at least one display mechanism, the device comprising: eyewear capable of being worn by a user for viewing a video signal from a computer when connected thereto; a signal-transmitting connection connecting the eyewear to a video output from the computer; a power supply; and a display mechanism for private viewing of the video signal, wherein the display mechanism provides for a field of display on the eyewear that is viewable by the user when wearing the device. Through the signal-transmitting connection the user is able to connect the eyewear display to the computer making visible in the eyewear display unit the images that were once seen on the computer screen. The display mechanism includes a standard display device such as a computer display.

In a preferred embodiment of the invention the eyewear is made of a frame and at least one lens mounted within said frame. Preferably the frame is made from a metal, plastic, composite, or combinations thereof and substantially resembles a standard eyeglass frame, which is portable and wearable by a user.

In another preferred embodiment, the video signal is displayed by a miniature liquid crystal display (LCD). The lens of the display system is composed of a LCD material. In still another preferred embodiment an LCD display is affixed to the at least one lens. The frame of the display system may also house a liquid crystal display (LCD) lens. The LCD lens permits the images within the display system to have computer-screen crisp clarity. The LCD lens is small enough to provide the user with adequate amount of space for viewing the computer screen.

In another preferred embodiment the at least one lens is glare preventing. Glare prevention may be accomplished by treating the lens with some glare preventing substance, such as with a coating or layer applied onto at least one lens surface. This is something that is common in the art of making eyeglasses. Glare prevention makes it easier for a user to see through the eyewear when the display capabilities are not in use.

In yet another preferred embodiment the connection device is a data transmission cable. The cable is attached to the frame and enables the user to connect the eyewear device to the computer. The connection device is capable of attaching to any standard video connector, to provide the convenience of universal connection to computer systems. Upon attachment of the eyewear display system to the computer through its connection, the system has a mechanism to activate computer monitor auto-blanking. The auto blanking system makes the user's computer screen blank and allows images only to be seen within the display unit. Thus, others cannot see the video display.

Preferably, the connection device is retractable for easy storage and security from loss or damage. For example, the cable has the capability to be retracted discreetly into the frame arm of the eyewear system. This is convenient for the user because the wire does not tangle upon itself. In another preferred embodiment the connection is a wireless connection. The device also has the potential of having a wireless feature. This feature will allow the eyewear display system to be functional with or with out the use of cabled wires. To employ the wireless feature an infrared, UHF, or similar mechanism would be substituted in place of the standard cabled connection.

In another preferred embodiment the display mechanism is a projection device. In a further aspect of this invention the projection device uses proximal vision off-axis technology as taught in U.S. Pat. No. 6,353,503, which is incorporated herein by reference in its entirety.

In another preferred embodiment the display mechanism depicts a scaleable view as would be seen using a standard display device. The scaleable view may show a partial or complete screen view. The user will not be able to see the entire computer screen, but the device is so fashioned that it gives limited amount of viewing of the computer screen at a time within the display system. A partial view allows the user to view parts of the video screen in smaller packets for easier comprehension.

In another preferred embodiment, a display navigation device is provided to move a cursor or pointer on the display. This display navigation device may be a frame-mounted track ball that allows the users ability to manipulate the pointer or the cursor of the computer screen inside the display unit. In a more preferred embodiment the display navigation device is a computer mouse. Cursor navigation ability allows the user to fully utilize a video output device such as a computer.

The properties of the screen may also be manipulated by the eyewear display system; mounted on the frame of the device are instruments that can control the properties of the device: resolution, magnification, contrast, brightness, horizontal and vertical center and size, zoom, pincushion, trapezoid, pin balance, parallelogram, rotation, complete screen view, partial screen view, and the like. These properties of the display lens may be adjusted to correspond to the users needs.

All modifications and improvements have been deleted herein for the sake of conciseness and readability but are properly within the scope of the following claims.

What is claimed is:

1. A peripheral device for a computer for private viewing of a standard video signal, the device comprising:

a) eyewear capable of being worn by a user for viewing a video signal from a computer when connected thereto;

b) a signal-transmitting connection connecting the eyewear to a video output from the computer, wherein the signal-transmitting connection causes another video output device connected to the computer to auto-blank;

c) a power supply; and d) a display mechanism for private viewing of the video signal, wherein the display mechanism provides for a field of display on the eyewear that is viewable by the user when wearing the device.

2. The device according to claim 1, wherein the eyewear is further comprised of:

a) a frame; and b) at least one lens mounted within said frame for displaying the video signal to the user.

3. The device according to claim 2, wherein the frame is made from a material selected from the group consisting of metal, plastic, composites, and combinations thereof.

4. The device according to claim 2, wherein the frame substantially resembles a standard eyeglass frame.

5. The device according to claim 2, wherein the display mechanism is a miniature LCD display.

6. The device according to claim 5, wherein the LCD display is affixed to the at least one lens.

7. The device according to claim 2, wherein the at least one lens is glare preventing.

8. The device according to claim 1, wherein the connection is a cable.

9. The device according to claim 8, wherein the cable is retractable.

10. The device according to claim 1, wherein the connection is a wireless connection.

11. The device according to claim 1, wherein the video signal is displayed by a miniature LCD display.

12. The device according to claim 1, wherein the display mechanism is a projection device.

13. The device according to claim 12, wherein the projection device uses proximal vision off-axis technology.

14. The device according to claim 1, wherein the display mechanism depicts a scaleable view as would be seen using a standard display device.

15. The device according to claim 14, wherein the scaleable view is a partial computer screen view.

16. The device according to claim 14, wherein the scaleable view is a complete computer screen view.

17. The device according to claim 1 further comprising a display navigation device to move a cursor or pointer on the display.

18. The device according to claim 17 wherein the display navigation device is a computer mouse.

* * * * *